United States Patent [19]

Simoni et al.

[11] Patent Number: 4,579,422

[45] Date of Patent: Apr. 1, 1986

[54] LIQUID CRYSTAL DEVICE FOR CONTINUOUS ROTATION OF SELECTIVE POLARIZATION OF MONOCHROMATIC LIGHT

[75] Inventors: Francesco Simoni; Roberto Bartolino; Nicola Guarracino; Nicola Scaramuzza, all of Cosenza; Giovanni Barbero, Turin; Armando Catalano, Cosenza, all of Italy

[73] Assignee: Consiglio Nazionale Delle Ricerche, Rome, Italy

[21] Appl. No.: 513,087

[22] Filed: Jul. 12, 1983

[30] Foreign Application Priority Data

Apr. 20, 1983 [IT] Italy .................. 84111 A/83

[51] Int. Cl.⁴ ................................ G02F 1/13
[52] U.S. Cl. .................. 350/331 R; 350/350 R; 350/351; 252/299.7
[58] Field of Search ........... 350/346, 336, 348, 341, 350/331 T, 337, 332, 350 R, 331 R, 351; 252/299.7

[56] References Cited

U.S. PATENT DOCUMENTS

| | | | |
|---|---|---|---|
| 3,669,525 | 1/1971 | Adams et al. | 252/299.7 X |
| 3,790,251 | 2/1974 | Wysocki et al. | 350/332 X |
| 3,833,287 | 9/1974 | Taylor et al. | 350/349 |
| 3,912,369 | 10/1975 | Kashnow | 350/341 X |
| 3,938,880 | 2/1976 | Haas et al. | 350/348 |
| 4,024,393 | 6/1977 | Dungan et al. | 350/331 T X |
| 4,068,926 | 6/1978 | Nakamura | 350/337 |
| 4,143,947 | 3/1979 | Aftergut et al. | 252/299.7 X |
| 4,241,339 | 12/1980 | Ushiyama | 350/337 X |

OTHER PUBLICATIONS

Yu et al., "Fluorescent Liquid Crystal Display Utilizing an Electric-Field-Induced Cholesteric-Nematic Transition", Applied Physics Letters, vol. 31, No. 11, Dec. 1, 1977, pp. 719-720.

Primary Examiner—John K. Corbin
Assistant Examiner—David Lewis
Attorney, Agent, or Firm—Kimmel, Crowell & Weaver

[57] ABSTRACT

A liquid crystal device for continuous rotation of the selective polarization of monochromatic light is provided by a cholesteric mixture with positive dielectric anisotrophy contained between a pair of glass plates which are conductive on the surface in contact with the mixture and have received a surface treatment to provide planar orientation for the mixture. A voltage is applied between the two glass plates and an input light polarizer is applied to one of the two glass plates. The device preferably uses a cholesteric mixture comprising cholesteryl chloride (31.2%), cholesteryl oleyl carbonate (47.7%) and cholesteryl nonanoate (21.1%) and is advantageously employed in laboratory polarization rotators and colored display units.

15 Claims, 6 Drawing Figures

LIQUID CRYSTAL DEVICE FOR CONTINUOUS ROTATION OF SELECTIVE POLARIZATION OF MONOCHROMATIC LIGHT

This invention relates to a liquid crystal device for the continuous rotation of the selective polarization of monochromatic light.

BACKGROUND OF THE INVENTION

Nematic liquid crystal devices are known. They are normally used for display units and are essentially based on the so-called electrically controlled birefringence (ECB), i.e. on the property of a suitably orientated electric field to rotate the nematic molecule, which has dielectric anisotrophy. In practice, the light which traverses a nematic crystal encounters a different refractive index according to the applied field. If the crystal is uniformly orientated and placed between mutually orthogonal polarizers, the polarized light which traverses it undergoes an ON-OFF effect as a function of the applied electric field.

However, these known nematic liquid crystal devices do not allow continuous polarization variation, but only sudden variations, which are of limited amplitude. Moreover, they do not allow the formation of coloured display units.

In addition to nematic liquid crystals, cholesteric liquid crystals are also known, these have a helical order in space in addition to an oriented order in the plane. At present, cholesteric liquid crystals are utilized for their property of continuously varying their colour as a function of temperature. For this reason they have been used primarily in the field of temperature measurement.

SUMMARY OF THE INVENTION

The present invention is based on the selective behavior of the relationship between the polarization rotation angle of a cholesteric mixture and an electric field applied to the mixture. The polarization rotation angle, as a function of the applied voltage, varies as the wavelength of the transmitted light varies. It has been found that the polarization rotation angle can be controlled by voltages in the order of 2 volts, and that starting from these voltages, the relationship between the polarization rotation angle and the applied voltage is linear.

The liquid crystal device for the continuous rotation of the selective polarization of monochromatic light according to the invention, which advantageously utilizes these properties, is characterized by:

a cholesteric mixture with positive dielectric anisotrophy, a pair of glass plates which are made conductive on the surfaces in contact with the mixture disposed therebetween and are treated to give planar orientation to this mixture, a voltage applied between the two glass plates, and an input light polarizer applied to one of the two glass plates.

The device, according to a preferred embodiment of the invention, used a cholesteric mixture of the following composition (by weight):

Cholesteryl chloride: 31.0–31.5%, preferably 31.2%.

Cholesteryl oleyl carbonate: 47.3–48.0%, preferably 47.7%.

Cholesteryl nonanoate: 20.5–21.7%, preferably 21.1%.

The surfaces of the glass plates which are in contact with the cholesteric mixture are made conductive by a deposition of indium or tin dioxide in order to provide planar orientation to the cholesteric mixture, the conducting surfaces of the glass plates are given an oblique evaporation of silicon oxide or a deposition of a silane solution.

OBJECTIVES OF THE INVENTION

One exemplary application of the device is a polarization rotator which includes the device, a temperature controller and a potentiometer for controlling the D.C. voltage applied between the two glass plates.

A further application of the device consists of a display unit comprising the device, a coloured filter applied to the input polarizer, and an analyzer for the polarized light which traverses the cholesteric mixture. In a modified embodiment of this second application, the coloured display unit can comprise the rotator device according to the invention, a coloured filter applied to the input polarizer and a reflecting surface provided on the other glass plate.

DESCRIPTION OF THE DRAWINGS

The present invention is further clarified hereinafter in terms of a preferred embodiment thereof and some of its applications with reference to the accompanying drawings, in which.

DESCRIPTION OF THE INVENTION

Figure 1:
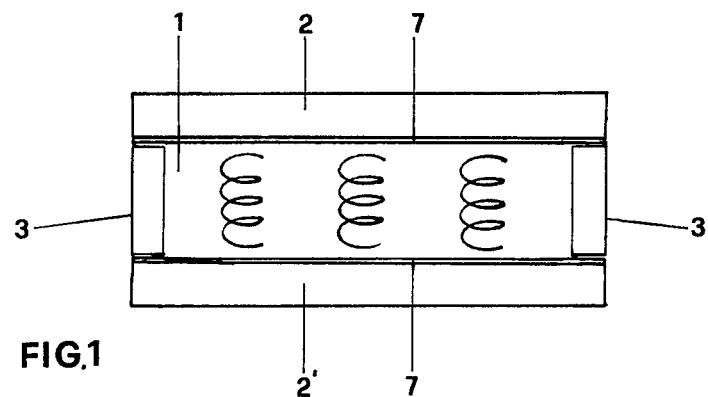
FIG. 1 is a diagrammatic section through a device according to the invention.

As can be seen in FIG. 1, the device according to the invention essentially comprises a cholesteric mixture 1 with positive dielectric anisotropy. The mixture is a liquid crystal formed from cholesteryl chloride, cholesteryl oleyl carbonate and cholesteryl nonanoate. It is disposed between two glass plates 2,2′ which are spaced apart by Mylar spacers 3. Mylar is a trademark for a film of polyethylene terephthalate. The surfaces of the glass plates in contact with the cholesteric mixture 1 are coated with a conductive film and are treated in order to favour planar orientation of the mixture.

Figure 2:
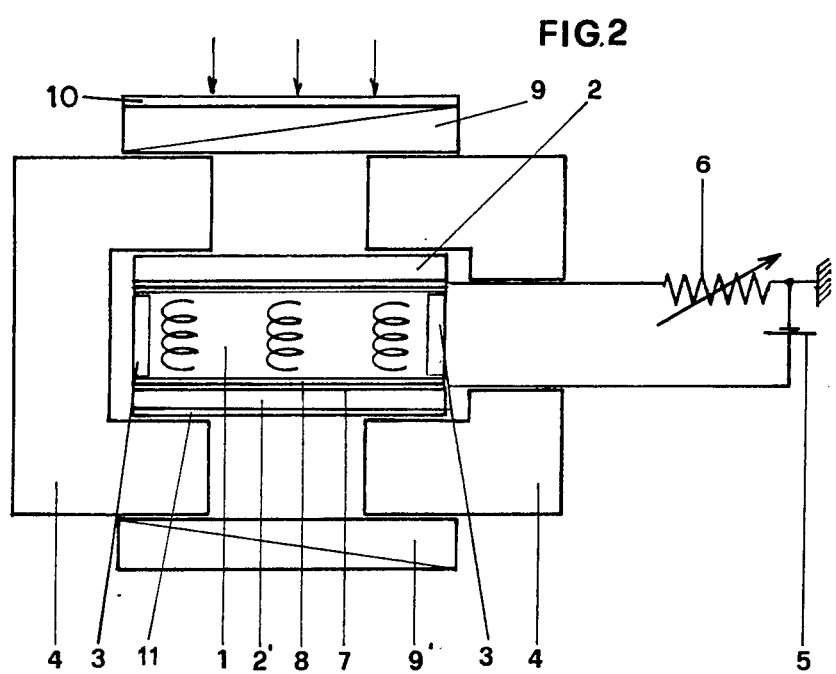
FIG. 2 is a diagrammatic section through the device fixed in a temperature-controlled sample holder.

FIG. 2 shows a "sandwich" formed from the two glass plates 2,2′ with the cholesteric mixture 1 and the spacers 3 therebetween, disposed in a temperature-controlled environment 4. The glass plates 2,2′ are connected to a D.C. voltage source 5 by way of a potentiometer 6.

Figure 3:
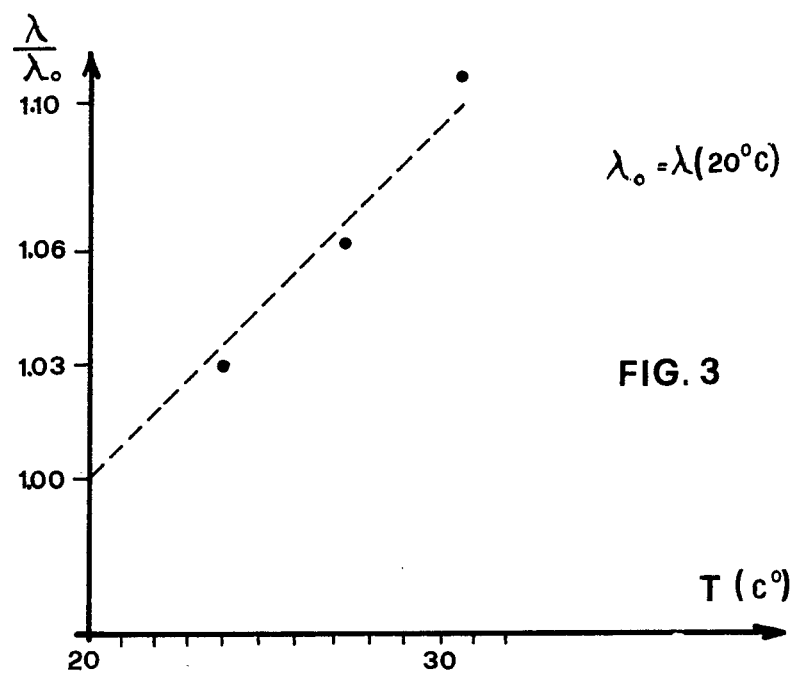
FIG. 3 is a graph showing the variation in the wavelength $\lambda_o$, corresponding to the minimum transmitted light, as the temperature T varies.
Figure 4:
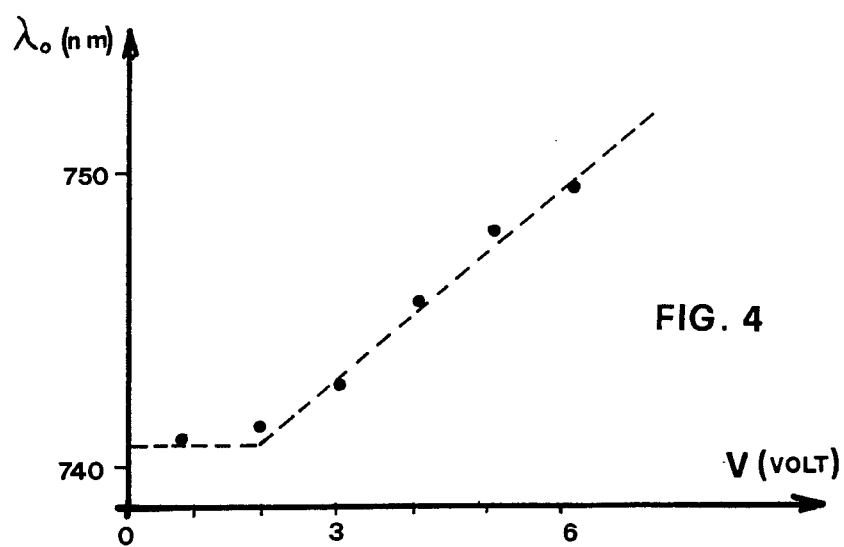
FIG. 4 is a graph showing the variation in the value of $\lambda_o$ as the applied voltage V varies.
Figure 5:
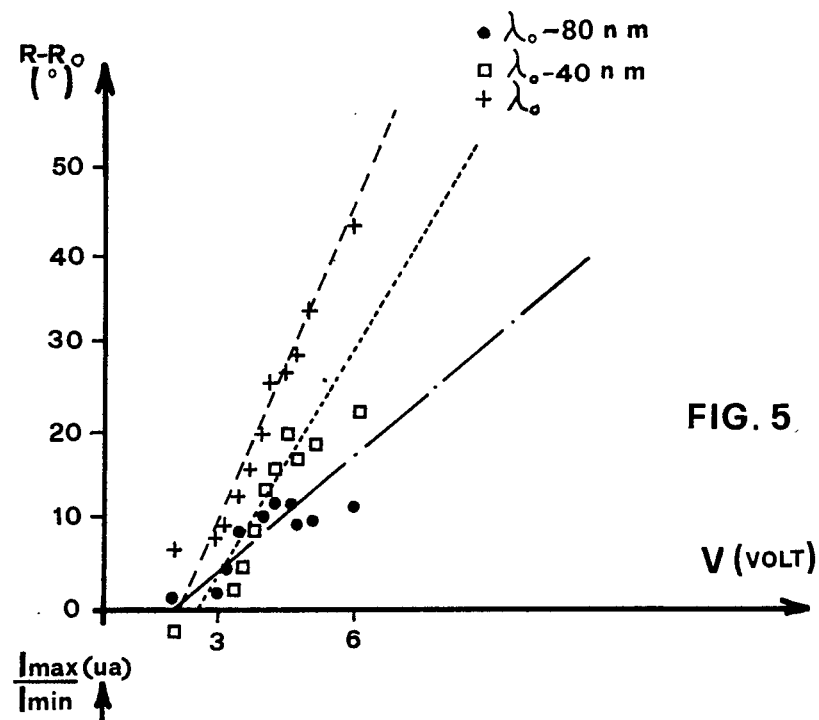
FIG. 5 is a graph showing the variation in the polarization angle R of the emergent light as the applied voltage V varies.
Figure 6:
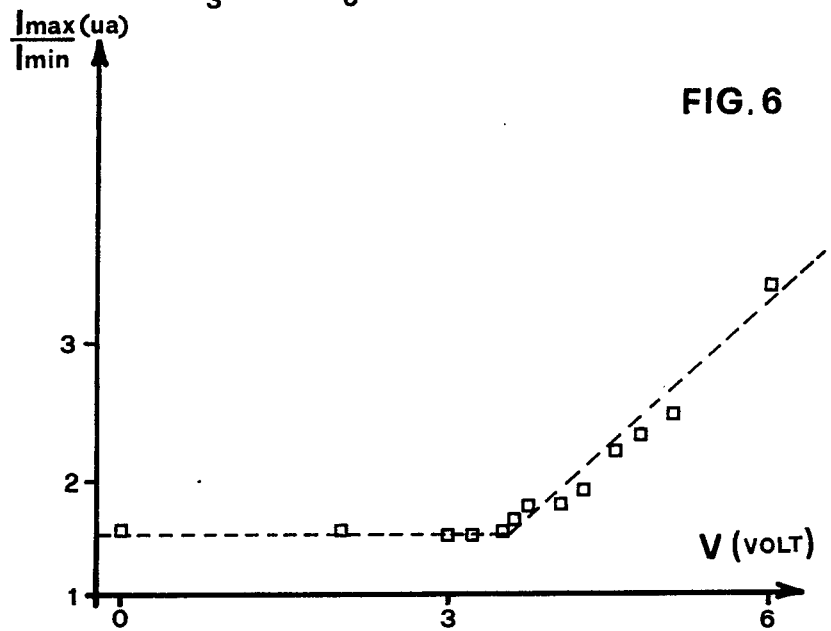
FIG. 6 is a graph showing the variation in the transmitted light intensity $i_{max}$ as the applied voltage V varies.

The operation of the device according to the invention is based on the observation of the following phenomena:

at ambient temperature, the spectral response of the system in the transmitted light for wavelength $\lambda_o$ is a minimum, and as the temperature T increases the value of the wavelength $\lambda$ increases with a substantially linear relationship (see FIG. 3);

as the applied voltage V increases from a limiting value ($\sim 2V$), the value of $\lambda_o$ increases with a substantially linear relationship (see FIG. 4);

if a monochromatic light of wavelength $\lambda_o$ is fed to the system, the polarization of the emergent light is rotated through an angle R, of which the value increases as the applied voltage V increases from the limiting value ($\sim 2V$), with a substantially linear relationship (see FIG. 5). In addition, the slope of the curve which expresses this relationship varies as the wavelength $\lambda$ varies, and is a maximum for $\lambda = \lambda_o$;

as the applied voltage V increases from the low limiting value ($\sim 2V$), the transmitted light intensity $i_{max}$ increases with a substantially linear relationship (see FIG. 6).

By virtue of the practical utilization of these phenomena, the device according to the invention is suitable for particular advantageous applications, in that:

it enables the incident light polarization plane to be continuously rotated as the applied voltage V varies, it is selective, in the sense that for every temperature there is a certain wavelength $\lambda_o$ for which the polarization rotation angle R varies strongly with the applied voltage V, whereas for other wavelengths $\lambda$ the variation in the rotation angle R is minimal, it has high sensitivity as a function of the applied voltage V.

The following example will further clarify the invention.

A cholesteric mixture was prepared with the following composition (by weight):

Cholesteryl chloride: 31.2%
Cholesteryl oleyl carbonate: 47.7%
Cholesteryl nonanoate: 21.1%.

This cholesteric mixture was disposed between two conducting glass plates 2,2' spaced apart by 9 $\mu$m by means of the spacers 3. The surface of the glass plates 2,2' in contact with the cholesteric mixture 1 was made conducting by means of an indium deposition 7, equally satisfactory results can be obtained by means of a tin dioxide deposition.

In order to obtain a good planar orientation of the cholesteric mixture 1, the glass plates 2,2' were repeatedly immersed in a 1% solution of a polymer surfactant of the silane family (for example MAP-E of CHISSO CORP.). After each immersion, the glass plates 2,2' were mechanically rubbed (Chatelin rubbing method), and at the end of treatment were placed in an oven at a temperature of 100° C. for one hour. The result of this treatment was the formation of a layer 8 adhering to the conducting surface of the glass plates 2,2' and comprising a plurality of microchannels which impose a certain orientation on the molecules of the mixture 1. This latter was introduced between the glass plates 2,2' by capillar action in the isotropic phase at approximately 50° C.

The "sandwich" formed in this manner was fixed into an electrically temperature-controlled sample holder 4 (see FIG. 2). The glass plates 2,2' were connected to the terminals of a 7.5 V battery 5, with a potentiometer 6 in parallel with it. Two crossing polarizers 9,9' were applied externally to the two glass plates 2,2' and a beam of monochromatic light of adjustable wavelength was made to orthogonally strike the surface of the input polarizer 9.

A reflectivity peak for $\lambda_o = 740$ NM was measured at 24° C. Then, using incident light having a wavelength $\lambda$ of 745 nm, the applied voltage was progressively varied from 0V to 6V. FIG. 5 shows the variation in the optical rotation angle R—$R_o$ of the polarization induced by the electric field on the linearly polarized light (the angle $R_o$ corresponds to zero voltage). This variation shows that up to 3V the optical rotation remains substantially constant, whereas for voltages between 3V and 6V there is continuous reversible rotation of the light polarization plane of about 45°.

As the wavelength $\lambda$ of the incident light was varied, analogous curves were obtained with a threshold which was always around 3V but with different slopes according to the value of $\lambda - \lambda_o$ (see FIG. 5).

Other tests were then carried out by varying the temperature T and observing how this led to a variation in the variation of $\lambda_o$ (see FIG. 3), while obtaining for each temperature, and thus for each $\lambda_o$, a pattern analogous to the angle of rotation R—$R_o$ as a function of the applied voltage V.

Finally, other tests were carried out in order to measure the value of the transmitted light intensity $i_{max}$ as a function of the applied voltage V, and the results of these tests are shown in FIG. 6.

By virtue of its characteristics, the device according to the invention is suitable for many practical applications, and in particular for use a laboratory polarization rotator and as a display unit.

LABORATORY POLARIZATION ROTATOR

In this application, the device according to the invention requires a temperature controller 4. As the temperature at which the device is controlled varies, the wavelength $\lambda$ of the incident light also varies, so that the device has a marked polarization rotation angle. As the applied voltage V varies, the polarization plane of the transmitted light of that wavelength rotates. For example, if two light beams of the same direction but different wavelength are required, the operating temperature is chosen at that value which makes the layer 1 sensitive to the wavelength of one of the two beams, and on varying the voltage V the respective polarization plane rotates relative to the other, which remains practically insensitive to this voltage variation.

In this manner an instrument is obtained which enables the angle between the two polarization planes to be varied by simply varying the voltage, without having to use actual rotation of the polarizer as in the past.

COLOURED DISPLAY UNIT

In this case, in which it is not necessary to use the temperature controller 4, a coloured polarizer (input polarizer 9 + coloured filter 10) and an analyzer (output polarizer 9') are associated respectively with the two glass plates 2,2'.

The polarized coloured incident light which traverses the input polarizer 9 is rotated by the cholesteric mixture 1 in the absence of applied voltage, and can either be transmitted or not transmitted according to how the analyzer 9' is arranged. In the first case, when a voltage is applied to the device, thus inducing further rotation of the light polarization plane, the transmitted light decreases as this voltage increases. In contrast, in the second case it increases. It therefore follows that by using suitable masks (for instance 7-segment matrices), the voltage which controls the individual segments determines whether these transmit light or not.

In an alternate embodiment, shown in FIG. 2, the analyzer 9' is replaced by a mirror 11 which causes the layer of cholesteric mixture 1 to be traversed a second time. This causes the input polarizer to act as an analyzer. In this case, the thickness of the layer of cholesteric mixture 1 is chosen such that the double passage of light through 1 causes the light either to be transmitted or not transmitted, as in the preceding case.

Instead of applying the mirror to the glass plate 2' it is also possible to replace this glass plate by the mirror.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What we claim is:

1. A liquid crystal device for the continuous rotation of the selective polarization of monochromatic light, comprising:
   a cholesteric mixture with positive dielectric anisotropy;
   first and second glass plates having facing conductive surfaces containing said cholesteric mixture therebetween;
   said facing conductive surfaces treated to impart planar orientation to said cholesteric mixture;
   a voltage applied between said glass plates; and
   an input light polarizer adjacent to said first glass plates,
   wherein said cholesteric mixture has the following composition (by weight) within the indicated range:
   Cholesteryl chloride: 31.0 to 31.5%
   Cholesteryl oleyl carbonate: 47.3 to 48.0%
   Cholesteryl nonanoate: 20.5 to 21.7%.

2. A device as defined in claim 1, wherein said conductive surfaces of said glass plates are indium depositions.

3. A device as defined in claim 1, wherein said conductive surfaces of said glass plates are tin dioxide depositions.

4. A device as defined in claim 1, wherein said conductive surfaces treatment is an oblique evaporation of silicon oxide.

5. A device as defined in claim 1, wherein said conductive surfaces treatment is a deposition of a silane solution.

6. A liquid crystal device for the continuous rotation of the selective polarization of monochromatic light, comprising:
   a cholesteric mixture with positive dielectric anisotropy;
   first and second glass plates having facing conductive surfaces containing said cholesteric mixture therebetween;
   said facing conductive surfaces treated to impart planar orientation to said cholesteric mixture;
   a voltage applied between said glass plates; and
   an input light polarizer adjacet to said first glass plates,
   wherein said cholesteric mixture has the following composition (by weight):
   Cholesteryl chloride: 31.2%
   Cholesteryl oleyl carbonate: 47.7%
   Cholesteryl nonanoate: 21.1%.

7. A coloured display unit, comprising:
   a cholesteric mixture with positive dielectric anisotropy;
   first and second glass plates having facing conductive surfaces containing said cholesteric mixture therebetween;
   said facing conductive surfaces treated to impart planar orientation to said cholesteric mixture;
   a voltage applied between said glass plates; and
   an input light polarizer adjacent to said first glass plates,
   wherein said cholesteric mixture has the following composition (by weight) within the indicated range:
   Cholesteryl chloride: 31.0 to 31.5%
   Cholesteryl oleyl carbonate: 47.3 to 48.0%
   Cholesteryl nonanoate: 20.5 to 21.7%.

8. A coloured display unit as defined in claim 7, and spacers disposed between said glass plates.

9. A coloured device unit as defined in claim 7, wherein said conductive surfaces of said glass plates are indium depositions.

10. A coloured device unit as defined in claim 7, wherein said conductive surfaces of said glass plates are tin dioxide depositions.

11. A coloured device unit as defined in claim 7, wherein said conductive surfaces treatment is an oblique evaporation of silicon oxide.

12. A coloured device unit as defined in claim 7, wherein said conductive surfaces treatment is a deposition of a silane solution.

13. A coloured display unit as defined in claim 7, and an output light polarizer adjacent to said second glass plate.

14. A coloured display unit as defined in claim 7, and means for causing said second glass plate to be reflective toward said first glass plate; and an output polarizer adjacent to said second glass plate.

15. A coloured display unit, comprising:
    a cholesteric mixture with positive dielectric anisotropy;
    first and second glass plates having facing conductive surfaces containing said cholesteric mixture therebetween;
    said facing conductive surfaces treated to impart planar orientation to said cholesteric mixture;
    a voltage applied between said glass plates; and
    an input light polarizer adjacent to said first glass plates,
    wherein said cholesteric mixture has the following composition (by weight):
    Cholesteryl chloride: 31.2%
    Cholesteryl oleyl carbonate: 47.7%
    Cholesteryl nonanoate: 21.1%.

* * * * *